United States Patent Office 2,871,116
Patented Jan. 27, 1959

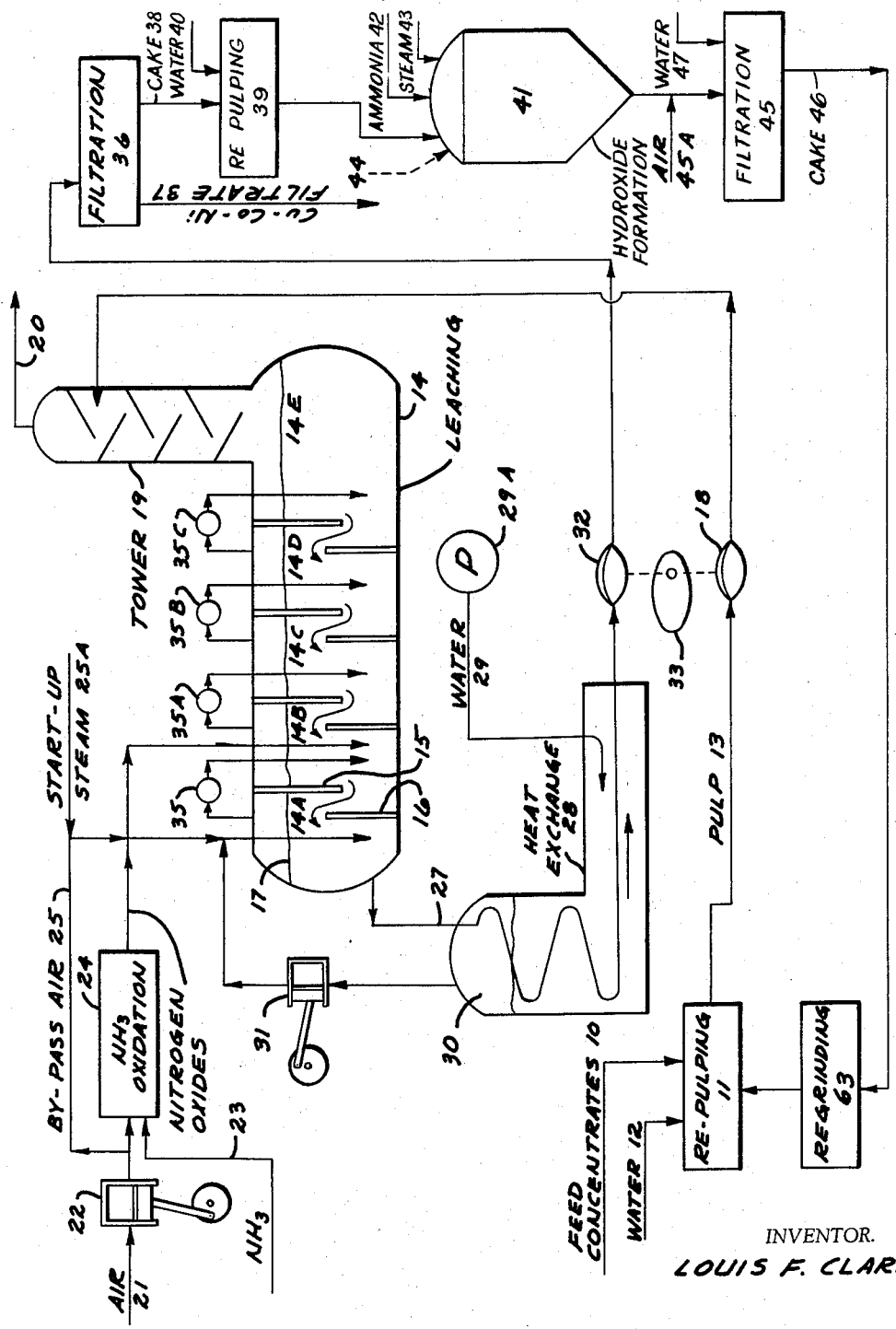

2,871,116

RECOVERING METAL VALUES FROM SULFUR CONTAINING ORES AND SOLUTIONS

Louis F. Clark, Pasadena, Calif.

Application October 18, 1954, Serial No. 462,861

8 Claims. (Cl. 75—108)

This invention is concerned with the recovery of metals (such as copper, cobalt, nickel, zinc and cadmium) which form sulphates that are soluble in water or dilute acid solutions from ores and concentrates containing sufficient sulphur to form such sulphates. The sulphur may be present as elemental sulphur or as sulphides, such as pyrite ($FeS_2$), marcasite ($FeS_2$), pyrrhotite $$(Fe_5S_6-Fe_{16}S_{17})$$

chalcopyrite ($CuFeS_2$), bornite ($Cu_5FeS_4$), arsenoypyrite ($FeS_2.FeAs_2$), chalcocite ($Cu_2S$), greenockite (CdS), sphalerite (ZnS), cobaltite ($CoS_2CoAs_2$), and pentlandite ($NiS_{21}FeS$). The invention contemplates improvements in processes and apparatus wherein the mineral mixture or compound containing the metal and the sulphur is subjected to oxidizing action in the presence of water at elevated temperature and pressure (as in an autoclave) so as to form sulphates and sulphuric acid and thus dissolve the metal to be recovered, say copper, nickel, cobalt, zinc or cadmium. At the same time compounds of iron, titanium, chromium or aluminum that are present will be converted (at least in part) to insoluble basic sulphates which can be separated from the soluble metal sulphates. Moreover, most of the uranium, vanadium, molybdenum, arsenic, antimony, tungsten and phosphorus content of the ore will be dissolved and then precipitated with the basic sulphates.

The recovery of copper and other metals from sulphide concentrates and the like by hydrometallurgical practices is attractive in many ways. It avoids smelting, with its attendant high fuel costs and holds the further possibility of producing, by chemical precipitation or electrolysis, purer metal products than those resulting from customary smelting procedures. However, sulphides of copper, cobalt, nickel, zinc, cadmium, etc., are extremely insoluble in most solvents at the temperatures that can be obtained under atmospheric conditions, and in consequence there have been many attempts, particularly recently, to accelerate and improve the dissolving action by operations in an autoclave at superatmospheric pressures and correspondingly high temperatures. By way of example, a recent development involves the autoclave treatment of an aqueous pulp of a mixed sulphide concentrate containing iron, arsenic, cobalt, nickel and copper for the recovery of the latter three metals. The pulp is treated at a pressure of 600 p. s. i. g. and a temperature of about 450° F. with a mixture of oxygen and steam. Under these conditions the copper, nickel and cobalt are dissolved as sulphates and the iron is converted partially to soluble sulphates but largely to insoluble basic sulphates. A substantial proportion of free sulphuric acid is also formed. The pulp is then removed from the autoclave with a sudden decrease in pressure to atmospheric, the release being made through a pressure relief valve. Thereafter the pulp is filtered to separate a solution containing sulphates of cobalt, nickel and copper with some iron sulphate and a filter cake consisting of undissolved minerals and gangue and some basic iron sulphate precipitate. The operation is a continuous one, raw pulp being pumped continuously into the autoclave and hot digested pulp being continuously removed and "flashed" to atmosphere. Thus far, the operation which has just been described has been attended by a number of difficulties. The raw pulp is abrasive and tends to "chew up" the pumps, valves and lines on the input side of the autoclave. In the autoclave itself abrasion is accompanied by corrosion due to the high temperatures and pressures and the presence of a fairly high concentration of free acid. The combined effects of corrosion and abrasion are particularly severe on the outlet side of the autoclave, where the life of the pressure relief valve is measured in hours rather than days. Attempts have been made to reduce the corrosion effects by adding slaked lime [$Ca(OH)_2$] to the raw pulp, and thus reduce the acid content in and from the autoclave, but both corrosion and abrasion have remained severe and the operations continue to present serious problems, not the least of which is an explosion hazard due to corrosion or abrasion and resulting thin walls in lines and pressure vessels.

I have found that the foregoing difficulties can be reduced greatly by incorporating in the raw pulp passing to the leaching or digestion autoclave a substantial proportion of finely divided hydroxide of a metal selected from the group consisting of iron, aluminum, chromium and titanium. Iron hydroxide is preferred and it is best to incorporate it in the form of a precipitate. The added iron hydroxide may, at the time of incorporation, be in the ferrous condition, but in the autoclave under the oxidizing conditions prevailing therein it will oxidize to trivalent form, which is required to form the insoluble basic iron sulphate. Iron hydroxide precipitate and the hydroxides of the other metals of the group (i. e. titanium, aluminum, and chromium) are slimy and act as lubricants, greatly reducing the abrasive action of the pulp on the inlet and outlet sides of the autoclave as well as within it. Secondly, the hydroxide combines with acid in the autoclave and reduces corrosion within the autoclave and on its outlet side, making unnecessary the addition of lime or other neutralizer. Thirdly, if the iron or other hydroxide of the group is present in substantial excess (i. e. more than is required to react with the sulphate medical present in free sulphuric acid and in sulphates of iron, chromium, etc.) it appears to exert a buffering action, and whatever be the explanation holds, the pH of the solution in the pulp leaving the autoclave at a substantially constant value (say 3), which eases subsequent operations by reducing required operating adjustments. (It should be noted at this point that the hydroxides of iron, chromium, aluminum and titanium [which for convenience are referred to hereinafter as the "third group hydroxides"] are when thus employed specific reagents for the $SO_4$ radical existing as free acid or as third group sulphates—to form the insoluble basic sulphates—leaving the $SO_4$ combined with Cu, Co, Ni, Zn, Cd, etc., still in solution. Fourthly, for reasons that will be discussed in detail later on, the introduction of the iron hydroxide tends to increase the capacity of the solution to carry copper, as well as other metals, thus improving recovery. This is for the reason that the iron tends to reduce the sulphate concentration by forming an insoluble basic ferric sulphate. Since the solubility of copper ion is dependent on the solubility product of copper sulphate, reduction of sulphate ion concentration permits the copper ion concentration to increase. Fifthly, ferric hydroxide (and the other third group hydroxides) under the conditions existing in the autoclave are themselves strong oxidizing agents for the sulphides—and are also quickly regenerated by the oxygen present, as distinguished from ferrous sulphate which, in acid solution, is only very slowly oxidized by a stream of air or oxygen. The net result of the foregoing actions of the iron hydroxide (for example) is to reduce corrosion and abrasion and to accelerate and improve the solution of the more valuable metals present, say copper, nickel, cobalt, zinc or cadmium—all of which form sulphates that have a high solubility in water and do not react with third-group sulphates to form insoluble precipitates.

The third group hydroxides for introduction to the leaching operation in the autoclave preferably are formed from the basic sulphates produced in leaching. Thus, my invention contemplates reacting the basic iron sulphate precipitates (for example) from the autoclave with ammonia to form ammonium sulphate and iron hydroxide, part of the latter precipitate being recycled to the autoclave with the inflowing untreated pulp. This not only gives a convenient source of iron hydroxide in ideal form for the process, but also yields a valuable by-product in the form of crystalline ammonium sulphate—which is salable as a fertilizer and easier to use for this purpose than the anhydrous ammonia employed in its manufacture.

These and other aspects of my invention will be understood more thoroughly in the light of the following description of several presently preferred practices, these being illustrated by the accompanying drawing, in which:

The drawing is a flow sheet of a system according to the invention. The operation illustrated by the drawing is suitable for the recovery of iron values from sulphate solutions. One source of sulphate solutions, which is part of the particular process illustrated in the drawing, is the treatment of concentrates of various materials which include sulphides or sulphur. The illustrated process is intended to take the concentrates and convert them to sulphate solutions, after which certain operations are performed in which the iron will precipitate as basic iron sulphate. It will be recognized that the invention comprehends the treatment of sulphate solutions, whatever the source.

The concentrates are received from the mill in a dewatered condition and are subjected to repulping 11 with water 12 (and certain recirculated materials to be described later) in a conventional rake or interrupted spiral flight type of classifier. The resulting pulp 13 is sufficiently fluid that it can be pumped through pipes by conventional mud pumps of the diaphragm, piston or centrifugal types. Positive displacement type diaphragm pumps are preferred for reasons to be discussed later.

The primary element of the apparatus of the drawing is a leaching or dissolving autoclave 14. This is in the form of a long horizontal drum lined with stainless steel or titanium to provide corrosion resistance (particularly to nitrates). The drum is divided into five compartments 14A, 14B, 14C, 14D, 14E in series by sets of upper baffles 15 and lower baffles 16 which form hydraulic seals between the compartments but permit flow of pulp from one compartment to the other, i. e. under the upper baffle and over the lower baffle, there being a pool of pulp in the drum up to a level 17 above the tops of the lower baffles.

The cold pulp for the leaching operation is pumped, preferably by a diaphragm pump 18, into the upper portion of a tower-type heat exchanger 19 provided with a series of superposed baffles or bubble trays. The bottom of the tower opens directly into the top of the compartment 14E on the right-hand end of the leaching autoclave, and the pulp drops through the tower countercurrent to a rising gas current of steam, residual air, and small proportions of nitrogen oxides. The pulp thus recovers heat from the rising gas current and also absorbs substantial proportions of nitrogen oxides (due to the presence of returned iron hydroxides in the pulp from sources to be discussed hereinafter). Uncondensed steam, unabsorbed nitrogen oxides and inert gaseous constituents of air, principally nitrogen, are vented at 20 from the top of the tower.

The oxidizing gases for the leaching operation are admitted at the opposite or left-hand end of the dissolving autoclave and pass through the drum in general countercurrent to the pulp. Pure oxygen can be employed, but in the presence of the recycled iron hydroxide air catalyzed by the addition of small proportions of nitrogen oxides is almost equally effective and generally cheaper. The air 21 is compressed at 22 and thereafter mixed with a small proportion, say 5% by volume of anhydrous ammonia 23 in a conventional ammonia converter 24, say one provided with a vanadium catalyst. In the converter, the ammonia is converted to higher nitrogen oxides, say $NO$, $NO_2$ and $N_2O_5$. Some of the compressed air by-passes the converter in a line 25. The mixture 26 of air and nitrogen oxides goes to the dissolving autoclave. Start-up steam 25A is admitted with the gaseous oxidizing mixture at the beginning of the operation to attain the required temperature and pressure. Thereafter it is shut off.

The hot leached or digested pulp 27 from the left-hand compartment 14A of the leaching autoclave is forced by the pressure prevailing in the autoclave through an indirect heat exchanger 28 countercurrent to a stream of water 29 forced into the system by a pump 29A. The hot end of the exchanger has a dome or receiver 30 in which low-pressure steam produced from the water accumulates. This steam is compressed by a piston-type vapor compressor 31 and is introduced into the left-hand or hot end of the dissolving autoclave. The compression raises the temperature of the steam substantially at the same time that its pressure is raised, and the operation results in converting mechanical energy to heat energy in the steam. In this way the heat energy in the digested pulp leaving the autoclave is recovered, supplemented by the mechanical energy of compression, and reintroduced to the autoclave in steam at usable pressures. The result is an avoidance of undesirable dilution in the autoclave, a recovery of waste heat, and a cooling of the digested pulp so that it is less destructive to the mechanism through which the final discharge occurs from the autoclave. This mechanism may be a conventional pressure relief valve, but I prefer to employ a positive-displacement diaphragm pump 32. A number of commercial diaphragm engine pumps are suitable. I prefer to employ one such as the Lapp pulsafeeder of completely non-metallic construction, which presents maximum corrosion and abrasion resistance and at the same time permits a positive displacement metered discharge. This preferred type of diaphragm pump is a combination piston-diaphragm pump in which, under ordinary conditions, the reciprocating piston acts on a hydraulic medium which in turn moves the diaphragm. In the instant case, the action is reversed, and the apparatus 32 acts not as a pump but as a combined relief valve and generator. Thus the diaphragm, under the pressure of the pulp, moves the piston and actually generates power at the same time that it controls the flow of digested pulp. The power thus generated is immediately utilized in the operation illustrated in the drawing, by mechanically linking the piston of the diaphragm pump controlling the pulp outflow from the dissolving autoclave with the piston on the other diaphragm pump (18) which is of the same type and which (as previously noted) is actually employed as a pump to the autoclave. The power generated is, however, not sufficient to carry on the pumping, so an auxiliary prime mover (33), say an electric motor, drives the common linkage of the two pumps. The main advantage of this common linkage and drive is not, however, the power saving that results but the coordination of pulp inflow and pulp outflow, so that a substantially constant pulp column can be maintained automatically in the autoclave, thus tending to maintain the constant optimum treatment conditions which are sought in a continuous operation such as this one.

It is now possible to consider the operation of the dissolving autoclave in detail. Prior to its introduction into the autoclave the raw feed is combined (in the repulping operation 10) with a sludge 34 (produced in subsequent operations yet to be described) containing a large proportion of freshly formed iron hydroxide precipitate together with concentrates which escaped digestion in the first pass through the dissolving autoclave. The iron hydroxide precipitate is slimy and serves as an excellent lubricant for inhibiting the abrasive action of the sulphide concentrates on pump, conduit and container walls.

As stated previously, the inflowing pulp picks up heat, condensed water and nitrogen oxides in falling through the tower into the dissolving autoclave countercurrent to the rising gases on the way to exhaust. In the autoclave proper, the pulp flows counter-current to the mixture of hot air, nitrogen oxides and steam introduced at the hot or left-hand end of the autoclave, the flow of pulp being toward the left in the drawing through the hydraulic seals between the baffles that define the series of compartments.

The high pressure steam is introduced into the compartment at the left-hand end of the autoclave, under the surface of the pulp pool so as to agitate it and obtain good conditions for heat interchange. Some of the hot air, with the catalyst nitrogen oxides, is introduced into the extreme left-hand compartment 14A, but the bulk of it is introduced into the next compartment 14B, again below the surface of the pulp pool so as to secure agitation and good contact between reactants. The gases are moved to the right from one compartment to the other by a series of vapor compressors 35, 35A, 35B, 35C, say positive-displacement blowers of the Roots or Connersville type, which draw gas from the vapor space in the top of one compartment and inject it into the pool in the next compartment, thus serving to agitate the pools at the same time they advance the gas and transfer to the pulp the heat generated in the compression.

The average pressure in the several compartments of the leaching autoclave is about 173 p. s. i. and the average pulp temperature in the autoclave is about 350° F. The mixture of air and nitrogen oxides is introduced to the autoclave at a pressure of about 175 p. s. i. and a temperature of about 420° F. The low pressure steam leaves the heat exchanger at about 118 p. s. i. and 340° F. and is boosted to about 178 p. s. i. and 426° F. in the compressor prior to its introduction to the autoclave.

The water from which the steam is formed should be demineralized to prevent the formation of scale in the heat exchanger. This is accomplished with conventional water-softening apparatus (not shown).

The residence time of the pulp in the autoclave averages from about 30 to about 60 minutes and the steam consumption (in terms of cold water added through the heat exchanger) is about 1.50 pounds of water per pound of dry solids in the pulp. The air employed is about 25 cubic feet of free air per pound of dry solids in the pulp, and the nitrogen oxides employed (measured in terms of $NH_3$) are about 0.02 pound per pound of dry solids in the pulp.

The following reactions may be taken as typical of those occurring in the dissolving autoclave of Fig. 1, employing an excess of ferric hydroxide:

On pyrite:

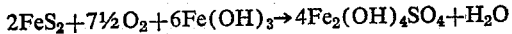

$$2FeS_2 + 7\tfrac{1}{2}O_2 + 6Fe(OH)_3 \rightarrow 4Fe_2(OH)_4SO_4 + H_2O$$

On chalcopyrite:

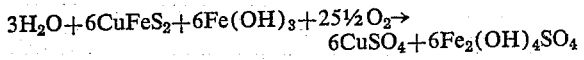

$$3H_2O + 6CuFeS_2 + 6Fe(OH)_3 + 25\tfrac{1}{2}O_2 \rightarrow 6CuSO_4 + 6Fe_2(OH)_4SO_4$$

It will be apparent that, with these reactions, when the total stoichiometric amount of $Fe(OH)_3$ is provided, there is no production of free $H_2SO_4$ which can build up in the autoclave. It is obvious and inherent that, when less-than-stoichiometric amounts of $Fe(OH)_3$ are added, $H_2SO_4$ may be formed. This free $H_2SO_4$ would, of course, be neutralized by further addition of $Fe(OH)_3$. Consequently, there is no opportunity for this acid to hinder the solution of the copper, as is the case when the ferric hydroxide is not present in an amount sufficient to neutralize the acid. At the same time corrosion problems are reduced.

Hydroxides of aluminum, chromium or titanium may be substituted for iron hydroxide in the process of the invention, and will give the same results as far as the action in the dissolving autoclave is concerned. However, these hydroxides are much less likely to be available in the desired quantities and prices, especially as by-products of the ore or concentrate being treated.

The regeneration of iron hydroxide for return to the dissolving autoclave of the drawing is as follows:

The treated pulp from the autoclave, after discharge through the heat exchanger and the diaphragm pump 32 (which operates as a valve and generator) is sent to filtration 36. The filtrate 37 is an aqueous sulphate solution of nickel, cobalt, and copper with a pH of about 3. It is substantially free of iron but will contain zinc and cadmium, etc. if these are present in the concentrate. It is also substantially free of impurities such as arsenic, antimony, phosphorus, molybdenum, uranium, vanadium, and rare earths, all of which, if present in the original concentrate, will be found in the filter cake along with the basic ferric sulphate, the siliceous gangue, and any undissolved metallic sulphides. This filter cake 38 is repulped at 39 in water 40 and then sent to a converter autoclave 41 where it is reacted at a pH of about 11 with ammonia 42, steam 43 and, if desired, a reducing agent 44 such as hydrogen or hydrazine. In some instances the use of the reducing agent is unnecessary. In any case, the amount employed should be less than that required to bring about precipitation of any metal. In the converter autoclave the basic iron sulphates are converted to iron hydroxide precipitate, the sulphate radical combining with the ammonia to form ammonium sulphate in solution. Any copper, plus any nickel, cobalt, zinc or cadmium entrained in the filter cake will remain in solution as ammoniacal complexes. The gangue, plus unattacked sulphides, and the impurities such as arsenic, antimony, molybdenum, vanadium, and the rare earths (if present) will remain with the solids in the autoclave conversion operation.

The autoclave conversion (hydroxide formation) preferably is conducted as a continuous operation at a temperature of about 250° F., a pressure of about 125 p. s. i. (absolute) and with an $NH_3$ concentration of about 20% (by weight). The average residence time in the autoclave is about 30 minutes. First autoclave 14 and second autoclave 41 are heated by direct steam injection. Because the steam is injected into a pressure vessel in which water in the liquid phase is always present, the pressure produced corresponds to that of saturated steam at the respective temperature attained plus the partial pressure of any other gas which may have been injected along with the steam.

The outflow from the converter autoclave is sent to a filtration operation 45 in an Oliver filter or the like, air 45A being admitted to the outflow of the autoclave. The resulting filter cake 46 is washed on the filter with water 47. The cake consists of the iron hydroxide precipitate formed in the converter autoclave, gangue, unattacked suphides, impurities such as arsenic, antimony, molybdenum, uranium, vanadium, tungsten, phosphorus and any rare earths present, these being in an insoluble condition, plus small proportions of entrained but dissolved cobalt, nickel and copper (and traces of dissolved zinc and cadmium if these are present in the feed).

At least a part of the cake 46 is recycled to the process, being subjected to regrinding 63, and repulping 11 with concentrates 10 and water 12. The excess cake, which includes ferric hydroxide, may be used as desired. The filtrate from filtration 45, containing ammonium sulphate, is withdrawn from the process for use as desired.

It is to be understood that the cake and the filtrate may or may not have impurities therein, depending entirely upon the nature of the material being processed, and in the event that the percentages of the impurities are great, then further treatment may be necessary in order to provide a product of sufficient purity for use outside the process. The salient feature, as far as this invention is concerned, is that, regardless of what other elements may be present in the starting material along with iron, a means is provided for removing iron, and at the same time providing a source of ammonium sulphate and ferric hydroxide.

I claim:

1. In the recovery of metals which form water soluble sulphates from a solid material containing iron and sufficient sulphur to form the sulphates by subjecting an aqueous pulp of the solid material to the action of gaseous oxygen in a first autoclave at a temperature sufficient to maintain saturated steam and superatmospheric pressure therein, there being sufficient water in said first autoclave to maintain saturated steam in contact with liquid water so as to produce a digested pulp containing a dissolved sulphate of the metal and undissolved basic iron sulphate, the improvement which comprises separating the dissolved metal sulphate from the undissolved basic iron sulphate, and thereafter adding water to the basic iron sulphate and converting the said basic iron sulphate to ferric hydroxide in the presence of water by reacting the basic iron sulphate with ammonia in a second autoclave at a temperature sufficient to maintain saturated steam and superatmospheric pressure therein, there being sufficient water in said second autoclave to maintain saturated steam in contact with liquid water, thereby producing an aqueous solution of ammonium sulphate and a precipitate of ferric hydroxide, separating the ferric hydroxide precipitate from the ammonium sulphate solution and returning the separated ferric hydroxide precipitate, at least in part, to the first autoclave in an amount sufficient to neutralize any free sulfuric acid present in the first autoclave.

2. A process according to claim 1 in which the second autoclave is maintained at a temperature of about 250° F., and a pressure of about 125 pounds per square inch absolute, and in which the ammonia is provided as a gas and has a concentration in the solution of about 20% by weight.

3. A process according to claim 1 in which the metals which form water soluble sulphates are selected from the group consisting of copper, nickel, cobalt, zinc, cadmium, uranium, vanadium, molybdenum, tungsten, and rare earth metals.

4. In the recovery of metals which form water soluble sulphates from a solid material containing iron and sulphide sulphur by subjecting an aqueous pulp of the solid material to the action of gaseous oxygen in a first autoclave at a temperature sufficient to maintain saturated steam and superatmospheric pressure therein, there being sufficient water in said first autoclave to maintain saturated steam in contact with liquid, so as to produce a digested pulp containing a dissolved sulphate of the metal and undissolved basic iron sulphate, the improvement which comprises separating the dissolved metal sulphate from the undissolved basic iron sulphate, and thereafter adding water to said basic iron sulphate and converting the said basic iron sulphate to ferric hydroxide in the presence of water by reacting the basic iron sulphate with ammonia in a second autoclave at a temperature sufficient to maintain saturated steam and superatmospheric pressure therein, there being sufficient water in said second autoclave to maintain saturated steam in contact with liquid water, thereby producing an aqueous solution of ammonium sulphate and a precipitate of ferric hydroxide, separating the ferric hydroxide precipitate from the ammonium sulphate solution and returning the separated ferric hydroxide precipitate, at least in part, to the first autoclave, in an amount sufficient to neutralize any free sulfuric acid present in the first autoclave.

5. A process according to claim 4 in which the second autoclave is maintained at a temperature of about 250° F., and a pressure of about 125 pounds per square inch absolute, and in which the ammonia is provided as a gas and has a concentration in the solution of about 20% by weight.

6. A process according to claim 4 in which the metals which form water soluble sulphates are selected from the group consisting of copper, nickel, cobalt, zinc, cadmium, uranium, vanadium, molybdenum, tungsten, and rare earth metals.

7. In a process for recovering iron values from aqueous sulphate solutions containing iron in solution in which process the sulphate solution is subjected to the action of gaseous oxygen in a first autoclave at a temperature which is sufficient to maintain steam and superatmospheric pressure therein, there being sufficient water in said first autoclave to maintain saturated steam in contact with liquid water, and thereby producing and precipitating basic iron sulphate, the improvement which comprises removing the basic iron sulphate from the first autoclave, and thereafter adding water to the basic sulphate and converting the said basic iron sulphate to ferric hydroxide in the presence of water by reacting the basic iron sulphate with ammonia in a second autoclave at a temperature which is sufficient to maintain saturated steam in contact with liquid water, thereby producing an aqueous solution of ammonium sulphate and a precipitate of ferric hydroxide, separating the ferric hydroxide precipitate from the ammonium sulphate solution, and returning the separated ferric hydroxide precipitate, at least in part, to the first autoclave, in an amount sufficient to neutralize any free sulphuric acid present in the first autoclave.

8. A process according to claim 7 in which the second autoclave is maintained at a temperature of about 250° F., and a pressure of about 125 pounds per square inch absolute, and in which the ammonia is provided as a gas and has a concentration in the solution of about twenty percent by weight.

References Cited in the file of this patent

UNITED STATES PATENTS

| Number | Name | Date |
|---|---|---|
| 951,940 | Crosse | Mar. 15, 1910 |
| 981,451 | McKechnie et al. | Jan. 10, 1911 |
| 1,144,402 | Vadner | June 29, 1915 |
| 1,528,206 | Greenawalt | Mar. 13, 1925 |
| 1,657,097 | Tracy | Jan. 24, 1928 |
| 1,657,666 | Ellis | Jan. 31, 1928 |
| 2,042,488 | Theiler | June 2, 1936 |
| 2,092,470 | Peebles | Sept. 7, 1937 |
| 2,124,291 | Fleisher | July 19, 1938 |
| 2,638,328 | Lewis | May 12, 1953 |
| 2,647,827 | McGauley | Aug. 4, 1953 |
| 2,670,271 | Thomsen | Feb. 23, 1954 |
| 2,694,006 | Schaufelberger et al. | Nov. 9, 1954 |
| 2,695,227 | Lebedeff | Nov. 23, 1954 |
| 2,717,829 | Dougherty | Sept. 13, 1955 |
| 2,776,207 | Mancke | Jan. 1, 1957 |